(12) United States Patent
Forehand

(10) Patent No.: US 11,750,891 B1
(45) Date of Patent: Sep. 5, 2023

(54) MACHINE LEARNING BASED SELECTIVE PRE-CACHING OF CONTENT FRAGMENTS ON WIRELESS COMMUNICATION DEVICES

(71) Applicant: T-Mobile Innovations LLC, Overland Park, KS (US)

(72) Inventor: Joseph Phillip Forehand, Parker, CO (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/168,474

(22) Filed: Feb. 13, 2023

(51) Int. Cl.
*H04N 21/647* (2011.01)
*H04N 21/2385* (2011.01)
*H04N 21/231* (2011.01)

(52) U.S. Cl.
CPC ... *H04N 21/64792* (2013.01); *H04N 21/2385* (2013.01); *H04N 21/23106* (2013.01)

(58) Field of Classification Search
CPC ......... H04N 21/2385; H04N 21/23106; H04N 21/64792
See application file for complete search history.

(56) References Cited

U.S. PATENT DOCUMENTS

| 9,444,897 B1* | 9/2016 | Bostick | H04N 21/44209 |
| 2014/0032698 A1* | 1/2014 | Hsu | H04N 21/2408 709/213 |
| 2018/0189226 A1* | 7/2018 | Hofverberg | G06F 15/167 |
| 2020/0201820 A1* | 6/2020 | Lutz | G06F 16/172 |
| 2020/0201930 A1* | 6/2020 | Lutz | G06F 16/9024 |

\* cited by examiner

*Primary Examiner* — Michael B. Pierorazio

(57) ABSTRACT

A method of selective pre-caching content fragments is disclosed. The method comprises receiving and analyzing, by an analytics engine, environment data pertaining to a wireless communication device and, based on the analyzing and based on a media presentation response, determining, by a pre-cache manager, an amount of fragments to provide to the wireless communication device for pre-caching to enable playback of the content at a certain quality. The method also comprises selecting, by the pre-cache manager, a subset of fragments of the content based on the determined amount of fragments and sending, by the computer system, the subset of fragments to the wireless communication device. The wireless communication device pre-caches the subset of fragments and presents the content using the cached subset of fragments and remaining fragments received from a content delivery network. The method further comprises receiving, by the analytics engine, playback data from the content delivery network.

20 Claims, 10 Drawing Sheets a content source to the consuming wireless communication device can vary in the quality of service that it can provide, and this variation can impact the user experience of accessing the content. For example, a video may be presented with considerable jitter and delay if the communication network transporting the content is congested with heavy communication traffic.

MACHINE LEARNING BASED SELECTIVE PRE-CACHING OF CONTENT FRAGMENTS ON WIRELESS COMMUNICATION DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication devices often display content. Content may be obtained from Internet sites, for example when a user "cruises the Internet," browsing special interest web sites. Content may be social networking content such as photos and/or videos. Content may be provided by on-line applications accessed from the wireless communication device such as utilities payment applications, banking applications, e-commerce applications. The communication network that is involved in transporting content from a content source to the consuming wireless communication device can vary in the quality of service that it can provide, and this variation can impact the user experience of accessing the content. For example, a video may be presented with considerable jitter and delay if the communication network transporting the content is congested with heavy communication traffic.

SUMMARY

In an embodiment, a method of selective pre-caching content fragments is disclosed. The method comprises receiving, by an analytics engine stored on and executed by a selective pre-caching computer system, environment data pertaining to a wireless communication device, analyzing, by the analytics engine, the environment data, and sending, by the selective pre-caching computer system, a media presentation request for content to a content delivery network. The content comprises a plurality of fragments. The method also comprises receiving, by the selective pre-caching computer system, a media presentation response from the content delivery network in response to the media presentation request and, based on analyzing the environment data and based on the media presentation response, determining, by a pre-cache manager stored on and executed by the selective pre-caching computer system, an amount of fragments to provide to the wireless communication device for pre-caching to enable playback of the content at a certain quality. The method additionally comprises selecting, by the pre-cache manager, a subset of fragments of the content for pre-caching on the wireless communication device based on the determined amount of fragments and sending, by the selective pre-caching computer system, the subset of fragments to the wireless communication device. The wireless communication device pre-caches the subset of fragments. The wireless communication device presents the content using the cached subset of fragments and remaining fragments of the plurality of fragments received from the content delivery network. The method further comprises receiving, by the analytics engine, playback data from the content delivery network corresponding to the wireless communication device presenting the content.

In another embodiment, a system for selectively pre-caching content fragments is disclosed. The system comprises a processor, a non-transitory memory, and an analytics engine stored in the non-transitory memory, that when executed by the processor, receives first environment data pertaining to a wireless communication device at a point in time, analyzes the first environment data, receives second environment data pertaining to the wireless communication device at a subsequent point in time, and analyzes the second environment data. The system also comprises a pre-cache manager stored in the non-transitory memory, that when executed by the processor, based on analyzing the first environment data, determines a first amount of fragments to provide to the wireless communication device for pre-caching to enable playback of a first set of content at a first quality and selects a subset of fragments of each content in the first set of content for pre-caching on the wireless communication device based on the determined first amount of fragments. The subset of fragments of each content in the first set of content is sent to the wireless communication device. The wireless communication device pre-caches the subset of fragments of each content in the first set of content. The pre-cache manager, when executed by the processor, also, based on analyzing the second environment data, determines a second amount of fragments to provide to the wireless communication device for pre-caching to enable playback of a second set of content at a second quality. The second amount of fragments and the first amount of fragments are different. The pre-cache manager, when executed by the processor, additionally selects a subset of fragments of each content in the second set of content for pre-caching on the wireless communication device based on the determined second amount of fragments. The subset of fragments of each content in the second set of content is sent to the wireless communication device to replace at least some pre-cached fragments on the wireless communication device. The wireless communication device removes the at least some pre-cached fragments and pre-caches the subset of fragments of each content in the second set of content.

In yet another embodiment, a method of selectively pre-caching content fragments is disclosed. The method comprises receiving, by an analytics engine stored on and executed by a selective pre-caching computer system, first environment data pertaining to a first wireless communication device and second environment data pertaining to a second wireless communication device, analyzing, by the analytics engine, the first environment data and the second environment data, and sending, by the selective pre-caching computer system, a media presentation request for content to a content delivery network. The content comprises a plurality of fragments. The method also comprises receiving, by the selective pre-caching computer system, a media presentation response from the content delivery network in response to the media presentation request and, based on analyzing the first environment data and based on the media presentation response, determining, by a pre-cache manager stored on and executed by the selective pre-caching computer system, a first amount of fragments to provide to the first wireless communication device for pre-caching to enable playback of the content at a first quality. The method additionally comprises selecting, by the pre-cache manager, a first subset of fragments of the content for pre-caching on the first wireless communication device based on the determined first amount of fragments and, based on analyzing the second environment data and based on the media presentation response, determining, by the pre-cache manager, a second amount of fragments to provide to the second wireless communication device for pre-caching to enable playback of the content at a second quality. The first amount of fragments and the second amount of fragments are different. The method further discloses selecting, by the pre-cache manager, a second subset of fragments of the content for pre-caching on the second wireless communication device based on the determined second amount of fragments and sending, by the selective pre-caching computer system, the first subset of fragments to the first wireless communication device and the second subset of fragments to the second wireless communication device. The first wireless communication device pre-caches the first subset of fragments and the second wireless communication device pre-caches the second subset of fragments. The first wireless communication device presents the content using the cached first subset of fragments and any remaining fragments received from the content delivery network. The second wireless communication device presents the content using the cached second subset of fragments and any remaining fragments received from the content delivery network.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
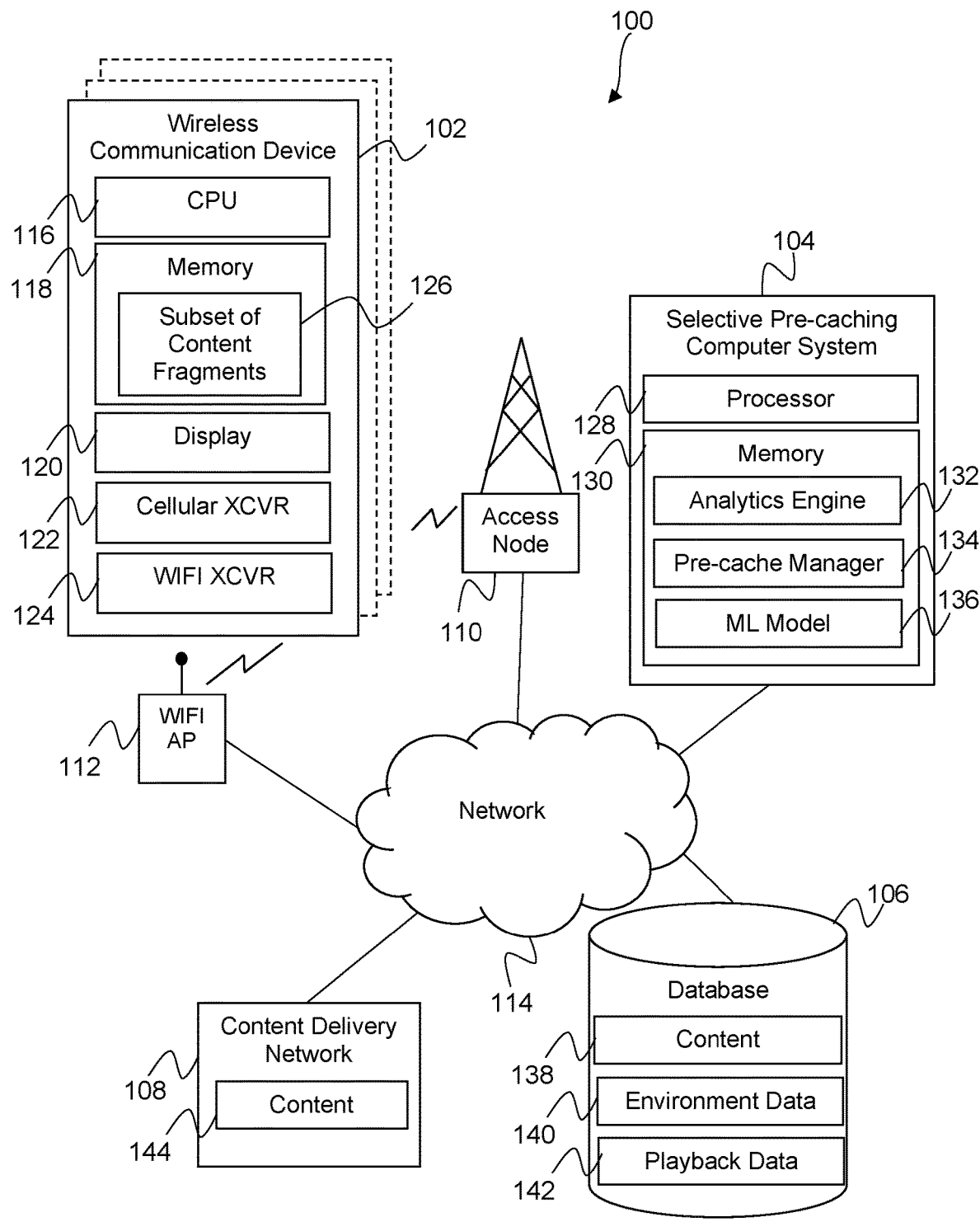
FIG. 1 is a block diagram of a selective pre-caching system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Wireless communication devices may pre-cache content on the device for future presentation. Pre-caching is distinguished from conventional caching in that caching typically involves locally storing data or content that has already been fetched from a different storage device and that is currently being used or consumed in anticipation of re-using the data or content in the future. The idea being that by storing this data or content locally, the slower process of fetching the data or content again from the different storage device is avoided. By contrast, pre-caching involves fetching and storing data or content from a different storage device (e.g., over the network from a content source) BEFORE the data or content has been requested by the user of the device or by an application executing on the device. Traditionally pre-caching for wireless communication devices includes pre-caching a whole piece of content. For example, a wireless communication device may receive an entire piece of content to pre-cache to enable timely playback. However, sometimes the wireless communication device never presents the content because a content display opportunity does not occur. Sending whole pieces of content to wireless communication devices especially when some of that content never gets consumed burdens network resources, which may already be strained. Additionally, having a wireless communication device pre-cache an entire piece of content especially when it may not be consumed may place unnecessary load on the wireless communication device's memory.

In contrast to the traditional approach, the pending application is directed to an intelligent pre-caching approach based on environment variables. In particular, the intelligent pre-caching approach discussed herein optimizes delivery of pre-cached content in fragments such that presentation of a piece of content on a wireless communication device can begin immediately based on the pre-cached fragments while streaming additional fragments from a content delivery network to complete the content experience. The optimum balance of pre-caching fragments versus streamed fragments to enable playback of content at a particular quality may be determined contextually based on environment data such as radio frequency environment data, overall radio network capacity, and/or packet core latency and routing metrics. At different times and/or locations, the environment data is different leading to a different balance of pre-caching versus real-time streaming of content fragments. Fragment size can be adapted based on machine learning, and the number of fragments to pre-cache on a wireless communication device can be adapted based on machine learning. Playback data may be received from the content delivery network and used to train the machine learning model used to determine the number of fragments to pre-cache and/or the fragment size. This intelligent pre-caching approach enables a more efficient use of network and device resources compared to the traditional approach of pre-caching the whole content.

Turning now to FIG. 1, a selective pre-caching system 100 is described. In an embodiment, the selective pre-caching system 100 comprises a wireless communication device 102, a selective pre-caching computer system 104, a database 106, a content delivery network 108, an access node 110, a WIFI access point 112, and a network 114. The wireless communication device 102 may be a mobile phone, a smart phone, a personal digital assistant (PDA), a wearable computer, a headset computer, a laptop computer, a notebook computer, a tablet computer, or another type of wireless communication device. There may be a plurality of wireless communication devices.

The wireless commination device 102 may comprise a processor 116 and a non-transitory memory 118. The wireless communication device 102 may also comprise a display 120, a cellular radio transceiver 122, and a WIFI radio transceiver 124. In an embodiment, the memory 118 stores a subset of content fragments 126 received from the selective pre-caching computer system 104.

The wireless communication device 102 may be configured to use the cellular radio transceiver 122 to establish a wireless communication link with the access node 110 to provide access to the network 114. The cellular radio transceiver 122 of the wireless communication device 102 may communicate with the access node 110 using any of a variety of wireless communication protocols including a 5G wireless communication protocol, a code division multiple access (CDMA) wireless communication protocol, a global system for mobile communication (GSM) wireless communication protocol, a long-term evolution (LTE) wireless communication protocol, or another wireless communication protocol. In some contexts, the access node 110 may be referred to as a cell tower or a cell site. The wireless communication device 102 may also be configured to use the WIFI radio transceiver 124 to establish a wireless communication link with the WIFI access point 112 to provide access to the network 114. The network 114 may comprise one or more private networks, one or more public networks, or a combination thereof. For example, the network 114 may comprise a radio access network (RAN) of a telecommunications service provider. The wireless communication device 102 may access the network 114 to obtain a variety of communication services.

In an embodiment, the selective pre-caching computer system 104 comprises a processor 128 and non-transitory memory 130. The memory 130 may comprise an analytics engine 132, a pre-cache manager 134, and a machine learning (ML) model 136. While only one ML model 136 is shown, there may be a plurality of ML models stored in the memory 130 of the selective pre-caching computer system 104. The selective pre-caching computer system 104 may be a general purpose computer described in more detail in regard to FIG. 4.

The selective pre-caching computer system 104 may receive a cache request from a content partner. In an embodiment, the content partner requests that particular content be provided to subscribers that meet certain target criteria. The content may include one or more advertisements, one or more public service announcements, or other content. In an embodiment, the content is in the form of a video. The content may take other forms as well such as audio or an image. Each piece of content may comprise a plurality of segments. At least some of the content 138 to be provided to subscribers is stored in the database 106. The selective pre-caching computer system 104 may determine one or more wireless communication devices including the wireless communication device 102 that meet the target criteria to receive the content 138 requested by the content partner.

In response to the cache request, the analytics engine 132 may request and receive environment data 140 pertaining to the wireless communication device 102. The environment data 140 may be stored in the database 106. The environment data 140 may be historical environment data. The environment data 140 may include radio frequency environment data associated with an area in which the wireless communication device 102 is located, overall radio network capacity in the area in which the wireless communication device 102 is located, packet core latency and routing metrics, and/or other environment data. The environment data 140 may also include a history of the wireless communication device 102 being in WIFI coverage and/or whether the wireless communication device 102 is currently within WIFI coverage. While illustrated as separate from the selective pre-caching computer system 104, in some embodiments, the database 106 may be a part of the selective pre-caching computer system 104 without departing from the spirit or scope of the present disclosure.

In response to the cache request, the selective pre-caching computer system 104 may send a media presentation request for the particular content to the content delivery network 108. In an embodiment, in addition to at least some of the particular content 138 being stored on the database 106, the particular content 144 is also stored on the content delivery network 108. In response to the media presentation request, the selective pre-caching computer system 104 may receive a media presentation response from the content delivery network 108. In an embodiment, assuming the particular content is a video, the media presentation response includes a plurality of different video opportunities for the particular content 144 at different video quality from the content delivery network 108. For example, the media presentation response may comprise a table of video opportunities for the particular content 144 at different video quality such as different amounts of resolution, different playback rates, different pixel counts, or other different video qualities available for the content delivery network 108 to deliver the particular content 144 to the wireless communication device 102.

As discussed above, the analytics engine 132 requests and receives the environment data 140. In an embodiment, after receipt of the environment data 140, the analytics engine 132 analyzes the environment data 140. As part of this analysis, the analytics engine 132 may apply machine learning to the environment data 140. For example, as part of the analysis of the environment data 140, the analytics engine 132 may apply the ML model 136. Based on the analysis of the environment data 140 and based on the media presentation response received from the content delivery network 108, the pre-cache manager 134 may determine an amount of content fragments to provide to the wireless communication device 102 for pre-caching to enable playback of the content at a certain quality. The certain quality may be predetermined based on an agreement with the subscriber. For example, the certain quality may be a particular resolution, playback rate, and/or other video quality characteristic.

As one non-limiting example, if the wireless communication device 102 is located in a first area, and the environment data 140 indicates that the first area has less cell coverage, the pre-cache manager 134 may determine to pre-cache a greater amount of fragments on the wireless communication device 102 than if the wireless communication device 102 were located in a different area with more cell coverage. As another non-limiting example, if the wireless communication device 102 is located in a second area, and the environment data 140 indicates that the second area has more load at the edge where the wireless communication device 102 is located, the pre-cache manager 134 may determine to pre-cache a greater amount of fragments on the wireless communication device 102 than if the wireless communication device 102 were located in a different area with less load at the edge.

In some embodiments, the determination of the amount of content fragments to provide to the wireless communication device 102 may also depend on a type of wireless communication device 102 and/or particular characteristics (e.g., memory, etc.) associated with the type of wireless communication device 102. In additional to determining an amount of content fragments to provide to the wireless communication device 102 for pre-caching, the pre-cache manager 134 may also determine a size of the content fragments to provide to the wireless communication device 102 based on the analysis of the environment data 140.

In an embodiment, the pre-cache manager 134 selects a subset of fragments of the content 138 for pre-caching on the wireless communication device 102 based on the determined amount of fragments and sends the selected subset of fragments to the wireless communication device 102 for storage and playback. The selected subset of fragments may be sent to the wireless communication device 102 via the network 114 and access node 110. Alternatively, the selected subset of fragments may be sent to the wireless communication device 102 via the network 114 and the WIFI access point 112 if the wireless communication device 102 is connected to the WIFI access point 112. The selected subset of fragments is illustrated in FIG. 1 as the subset of content fragments 126 stored in the memory 118 of the wireless communication device 102. The subset of content fragments 126 may be selected based on applying the ML model 136 to the environment data 140. The subset of content fragments 126 selected may not be contiguous fragments. For example, if the particular content 138 is divided into 10 fragments, the subset of content fragments 126 selected may include content segment 1, content segment 3, and content segment 9.

In an embodiment, the wireless communication device 102 pre-caches the subset of content fragments 126. When the wireless communication device 102 is to present the particular content on the display 120, the wireless communication device 102 may receive any remaining fragments from the content delivery network 108 and use both the subset of content fragments 126 pre-cached on the wireless communication device 102 and any remaining fragments received from the content delivery network 108 to present the particular content on the display 120. For example, the wireless communication device 102 may use a local Uniform Resource Locator (URL) for playback of the pre-cached subset of content fragments 126 and a redirect URL to the content delivery network 108 for playback of any remaining fragments not pre-cached.

In an embodiment, if the particular content is consumed by the wireless communication device 102, the content delivery network 108 provides playback data 142 to the analytics engine 132. The playback data 142 may indicate that the particular content was consumed by the wireless communication device 102 at a particular video quality such as a particular resolution. The playback data 142 may be stored in the database 106. The playback data 142 may be used by the selective pre-caching computer system 104 to train the ML model 136. For instance, as one non-limiting example, if the playback data 142 indicates that a resolution target is not being met in a particular location, the selective pre-caching computer system 104 may determine to increase the number of content fragments being pre-cached on wireless communication devices in that particular location to try to meet the resolution target at playback. The term "a particular location" is a contiguous area where network communication environment conditions are at least mostly uniform. The contiguous area may be a coverage area of one cell site. The contiguous area may be a combined coverage area of two cell sites. The contiguous area may be a combined coverage area of three cell sites. The contiguous area may be a combined coverage area of four cell sites, five cell sites, six cell sites, seven cell sites, eight cell sites, nine cell sites, or ten cell sites. The contiguous area may be a combined coverage area of from two or more cell sites but less than fifty cell sites. The contiguous area may be a city limits of a town, suburb, or city. The contiguous area may be a major trading area (MTA). What is deemed "a particular location" may change based on changed environment conditions, for example based on changed weather conditions, based on seasonal conditions (leaves on trees versus no leaves on trees, college in session versus college not in session, school in session versus school not in session). What is deemed "a particular location" may change over time as demographics change and/or as a small town grows to be a large town.

The selective pre-caching computer system 104 may pre-cache content fragments on the wireless communication device 102 every x number of minutes, hourly, once a day, or some other amount of time. In an embodiment, since the wireless communication device 102 is mobile and moving around with the subscriber, the environment data 140 that pertains to the wireless communication device 102 is constantly changing, and consequently the amount of content fragments to be pre-cached on the wireless communication device 102 is also dynamic. Thus, the selective pre-caching computer system 104 may pre-cache content fragments on the wireless communication device 102 more often such as every x number of minutes.

Figure 2:
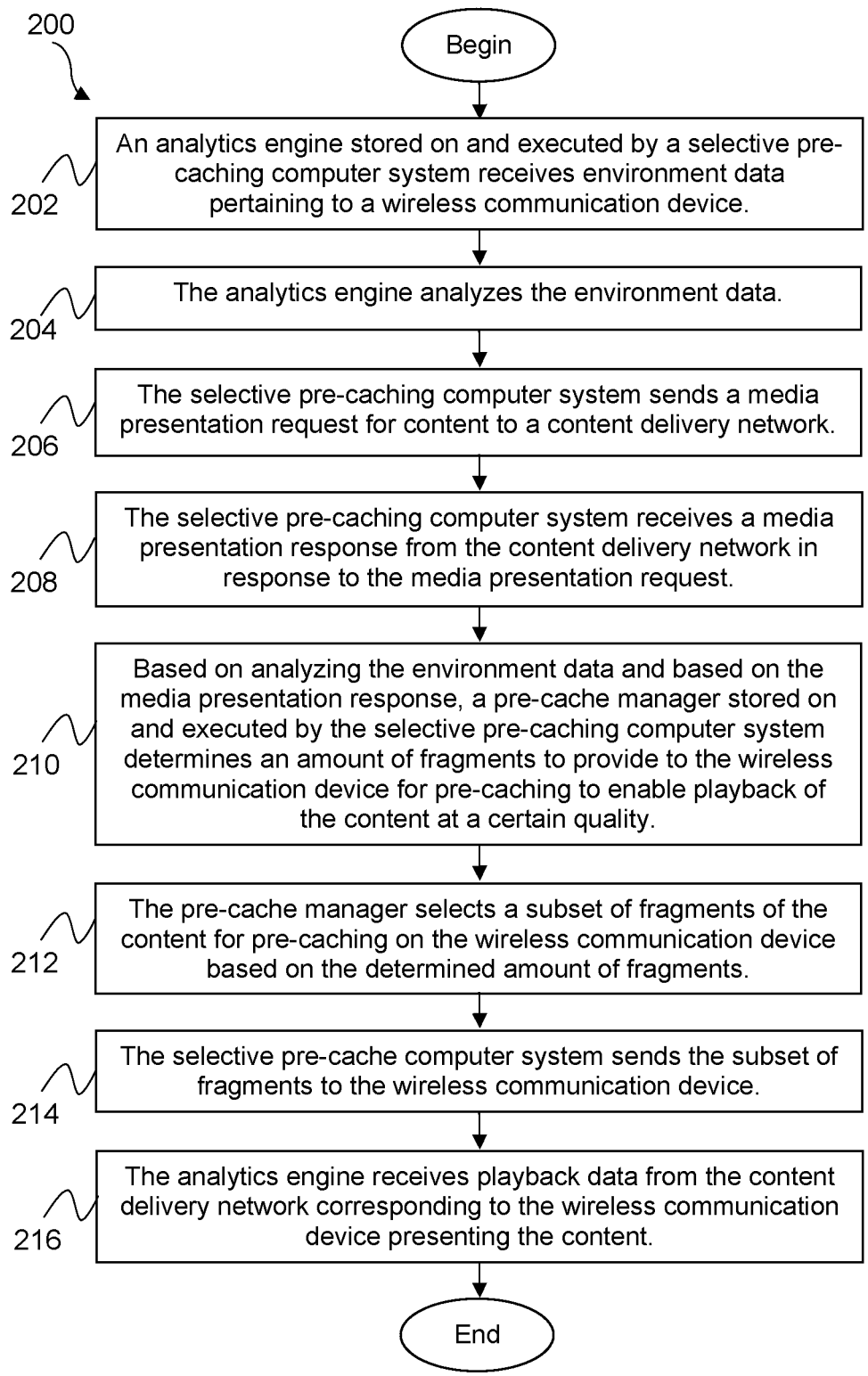
FIG. 2 is a flow chart of a method according to an embodiment of the disclosure.

Turning now to FIG. 2, a method 200 is described. In an embodiment, the method 200 is a method of selectively pre-caching content fragments. At block 202, an analytics engine (e.g., analytics engine 132) stored on and executed by a selective pre-caching computer system (e.g., selective pre-caching computer system 104) receives environment data (e.g., environment data 140) pertaining to a wireless communication device (e.g., wireless communication device 102). At block 204, the analytics engine analyzes the environment data. At block 206, the selective pre-caching computer system sends a media presentation request for content (e.g., content 138) to a content delivery network (e.g., content delivery network 108). The content comprises a plurality of fragments. At block 208, the selective pre-caching computer system receives a media presentation response from the content delivery network in response to the media presentation request.

At block 210, based on analyzing the environment data and based on the media presentation response, a pre-cache manager (e.g., pre-cache manager 134) stored on and executed by the selective pre-caching computer system determines an amount of fragments to provide to the wireless communication device for pre-caching to enable playback of the content at a certain quality. At block 212, the pre-cache manager selects a subset of fragments of the content for pre-caching on the wireless communication device based on the determined amount of fragments. At block 214, the selective pre-cache computer system sends the subset of fragments to the wireless communication device. The wireless communication device pre-caches the subset of fragments. Pre-caching the subset of fragments on the wireless communication device may include storing in non-transitory memory and associating to a handle for retrieving. The wireless communication device presents the content using the cached subset of fragments and remaining fragments of the plurality of fragments received from the content delivery network. At block 216, the analytics engine receives playback data from the content delivery network corresponding to the wireless communication device presenting the content.

Figure 3A:
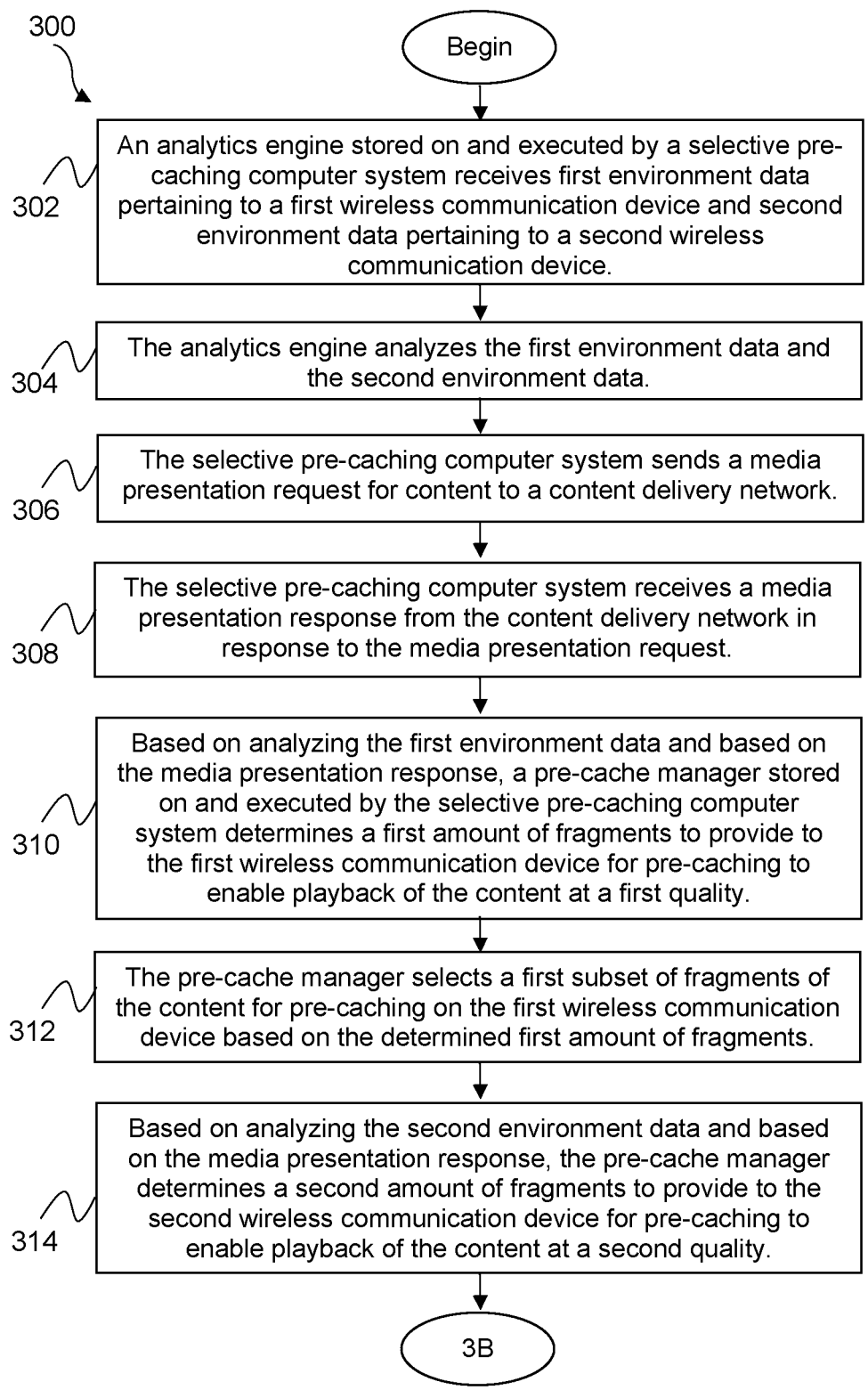
FIGS. 3A and 3B is a flow chart of a method according to an embodiment of the disclosure.
Figure 3B:
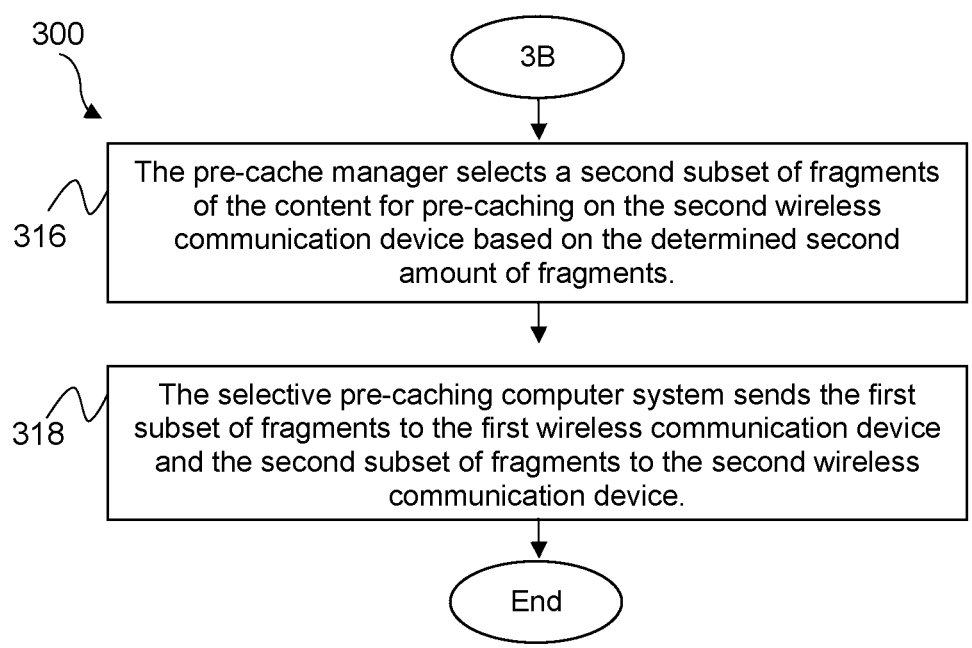

Turning now to FIG. 3A and FIG. 3B, a method 300 is described. In an embodiment, the method 300 is a method of selectively pre-caching content fragments. At block 302, an analytics engine (e.g., analytics engine 132) stored on and executed by a selective pre-caching computer system (e.g., selective pre-caching computer system 104) receives first environment data pertaining to a first wireless communication device and second environment data pertaining to a second wireless communication device. At block 304, the analytics engine analyzes the first environment data and the second environment data. At block 306, the selective pre-caching computer system sends a media presentation request for content to a content delivery network (e.g., content delivery network 108). The content comprises a plurality of fragments. At block 308, the selective pre-caching computer system receives a media presentation response from the content delivery network in response to the media presentation request.

At block 310, based on analyzing the first environment data and based on the media presentation response, a pre-cache manager (e.g., pre-cache manger 134) stored on and executed by the selective pre-caching computer system determines a first amount of fragments to provide to the first wireless communication device for pre-caching to enable playback of the content at a first quality. At block 312, the pre-cache manager selects a first subset of fragments of the content for pre-caching on the first wireless communication device based on the determined first amount of fragments.

At block 314, based on analyzing the second environment data and based on the media presentation response, the pre-cache manager determines a second amount of fragments to provide to the second wireless communication device for pre-caching to enable playback of the content at a second quality. The first amount of fragments and the second amount of fragments are different. At block 316, the pre-cache manager selects a second subset of fragments of the content for pre-caching on the second wireless communication device based on the determined second amount of fragments.

At block 318, the selective pre-caching computer system sends the first subset of fragments to the first wireless communication device and the second subset of fragments to the second wireless communication device. The first wireless communication device pre-caches the first subset of fragments and the second wireless communication device pre-caches the second subset of fragments. The first wireless communication device presents the content using the cached first subset of fragments and any remaining fragments received from the content delivery network. The second wireless communication device presents the content using the cached second subset of fragments and any remaining fragments received from the content delivery network.

Figure 4:
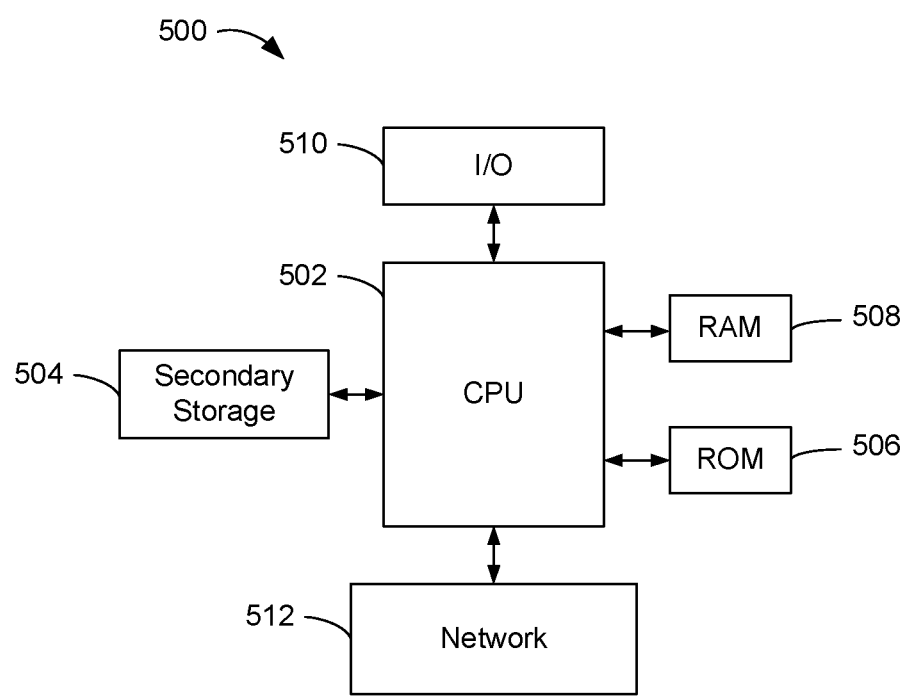
FIG. 4 is a block diagram of a computer system implemented within the communication system of FIG. 1 according to an embodiment of the disclosure.

FIG. 4 illustrates a computer system 500 suitable for implementing one or more embodiments disclosed herein. The computer system 500 includes a processor 502 (which may be referred to as a central processor unit or CPU) that is in communication with memory devices including secondary storage 504, read only memory (ROM) 506, random access memory (RAM) 508, input/output (I/O) devices 510, and network connectivity devices 512. The processor 502 may be implemented as one or more CPU chips.

It is understood that by programming and/or loading executable instructions onto the computer system 500, at least one of the CPU 502, the RAM 508, and the ROM 506 are changed, transforming the computer system 500 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 500 is turned on or booted, the CPU 502 may execute a computer program or application. For example, the CPU 502 may execute software or firmware stored in the ROM 506 or stored in the RAM 508. In some cases, on boot and/or when the application is initiated, the CPU 502 may copy the application or portions of the application from the secondary storage 504 to the RAM 508 or to memory space within the CPU 502 itself, and the CPU 502 may then execute instructions that the application is comprised of. In some cases, the CPU 502 may copy the application or portions of the application from memory accessed via the network connectivity devices 512 or via the I/O devices 510 to the RAM 508 or to memory space within the CPU 502, and the CPU 502 may then execute instructions that the application is comprised of. During execution, an application may load instructions into the CPU 502, for example load some of the instructions of the application into a cache of the CPU 502. In some contexts, an application that is executed may be said to configure the CPU 502 to do something, e.g., to configure the CPU 502 to perform the function or functions promoted by the subject application. When the CPU 502 is configured in this way by the application, the CPU 502 becomes a specific purpose computer or a specific purpose machine.

The secondary storage 504 is typically comprised of one or more disk drives or tape drives and is used for non-volatile storage of data and as an over-flow data storage device if RAM 508 is not large enough to hold all working data. Secondary storage 504 may be used to store programs which are loaded into RAM 508 when such programs are selected for execution. The ROM 506 is used to store instructions and perhaps data which are read during program execution. ROM 506 is a non-volatile memory device which typically has a small memory capacity relative to the larger memory capacity of secondary storage 504. The RAM 508 is used to store volatile data and perhaps to store instructions. Access to both ROM 506 and RAM 508 is typically faster than to secondary storage 504. The secondary storage 504, the RAM 508, and/or the ROM 506 may be referred to in some contexts as computer readable storage media and/or non-transitory computer readable media.

I/O devices 510 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 512 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 512 may provide wired communication links and/or wireless communication links (e.g., a first network connectivity device 512 may provide a wired communication link and a second network connectivity device 512 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 512 may enable the processor 502 to communicate with the Internet or one or more intranets. With such a network connection, it is contemplated that the processor 502 might receive information from the network, or might output information to the network in the course of performing the above-described method steps. Such information, which is often represented as a sequence of instructions to be executed using processor 502, may be received from and outputted to the network, for example, in the form of a computer data signal embodied in a carrier wave.

Such information, which may include data or instructions to be executed using processor 502 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 502 executes instructions, codes, computer programs, scripts which it accesses from hard disk, floppy disk, optical disk (these various disk based systems may all be considered secondary storage 504), flash drive, ROM 506, RAM 508, or the network connectivity devices 512. While only one processor 502 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 504, for example, hard drives, floppy disks, optical disks, and/or other device, the ROM 506, and/or the RAM 508 may be referred to in some contexts as non-transitory instructions and/or non-transitory information.

In an embodiment, the computer system 500 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 500 to provide the functionality of a number of servers that is not directly bound to the number of computers in the computer system 500. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 500, at least portions of the contents of the computer program product to the secondary storage 504, to the ROM 506, to the RAM 508, and/or to other non-volatile memory and volatile memory of the computer system 500. The processor 502 may process the executable instructions and/or data structures in part by directly accessing the computer program product, for example by reading from a CD-ROM disk inserted into a disk drive peripheral of the computer system 500. Alternatively, the processor 502 may process the executable instructions and/or data structures by remotely accessing the computer program product, for example by downloading the executable instructions and/or data structures from a remote server through the network connectivity devices 512. The computer program product may comprise instructions that promote the loading and/or copying of data, data structures, files, and/or executable instructions to the secondary storage 504, to the ROM 506, to the RAM 508, and/or to other non-volatile memory and volatile memory of the computer system 500.

In some contexts, the secondary storage 504, the ROM 506, and the RAM 508 may be referred to as a non-transitory computer readable medium or a computer readable storage media. A dynamic RAM embodiment of the RAM 508, likewise, may be referred to as a non-transitory computer readable medium in that while the dynamic RAM receives electrical power and is operated in accordance with its design, for example during a period of time during which the computer system 500 is turned on and operational, the dynamic RAM stores information that is written to it. Similarly, the processor 502 may comprise an internal RAM, an internal ROM, a cache memory, and/or other internal non-transitory storage blocks, sections, or components that may be referred to in some contexts as non-transitory computer readable media or computer readable storage media.

Figure 5:
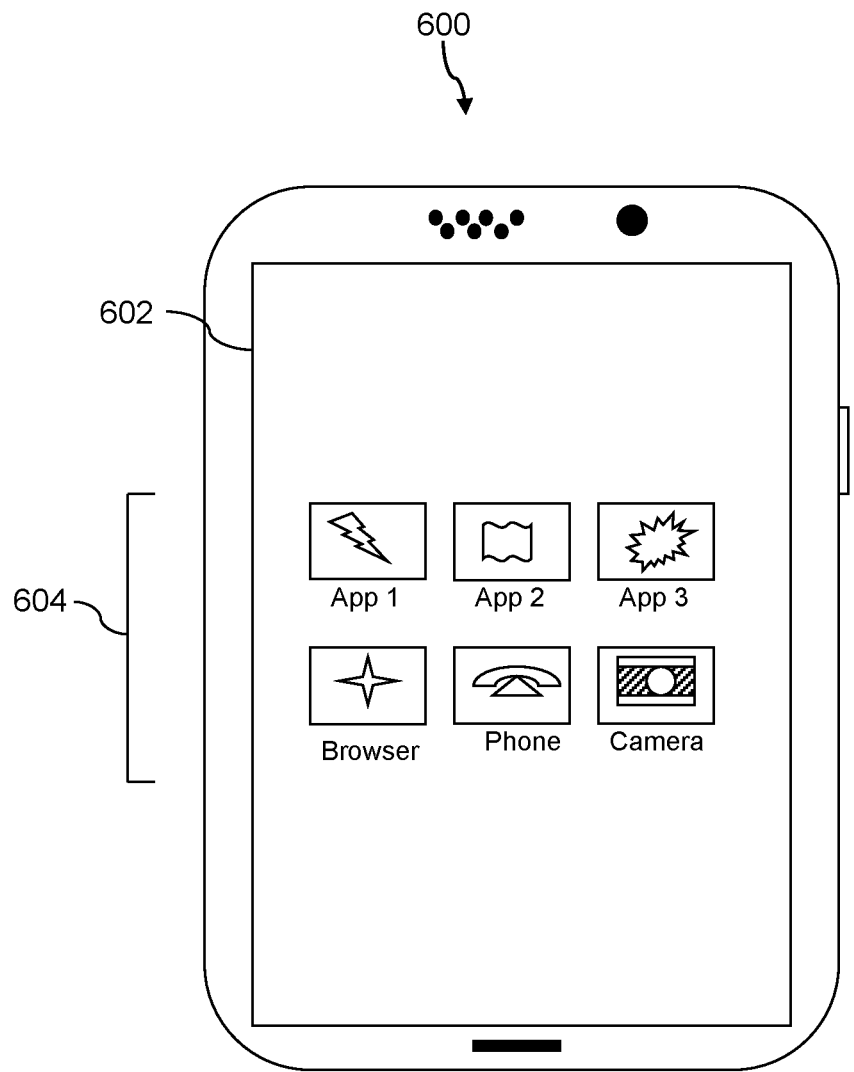
FIG. 5 is an illustration of a wireless communication device according to an embodiment of the disclosure.

FIG. 5 depicts the user equipment (UE) 600, which is operable for implementing aspects of the present disclosure, but the present disclosure should not be limited to these implementations. Though illustrated as a mobile phone, the UE 600 may take various forms including a wireless handset, a pager, a personal digital assistant (PDA), a gaming device, or a media player. The UE 600 includes a touch-screen display 602 having a touch-sensitive surface for input by a user. A small number of application icons 604 are illustrated within the touch screen display 602. It is understood that in different embodiments, any number of application icons 604 may be presented in the touch screen display 602. In some embodiments of the UE 600, a user may be able to download and install additional applications on the UE 600, and an icon associated with such downloaded and installed applications may be added to the touch screen display 602 or to an alternative screen. The UE 600 may have other components such as electro-mechanical switches, speakers, camera lenses, microphones, input and/or output connectors, and other components as are well known in the art. The UE 600 may present options for the user to select, controls for the user to actuate, and/or cursors or other indicators for the user to direct. The UE 600 may further accept data entry from the user, including numbers to dial or various parameter values for configuring the operation of the handset. The UE 600 may further execute one or more software or firmware applications in response to user commands. These applications may configure the UE 600 to perform various customized functions in response to user interaction. Additionally, the UE 600 may be programmed and/or configured over-the-air, for example from a wireless base station, a wireless access point, or a peer UE 600. The UE 600 may execute a web browser application which enables the touch screen display 602 to show a web page. The web page may be obtained via wireless communications with a base transceiver station, a wireless network access node, a peer UE 600 or any other wireless communication network or system.

Figure 6:
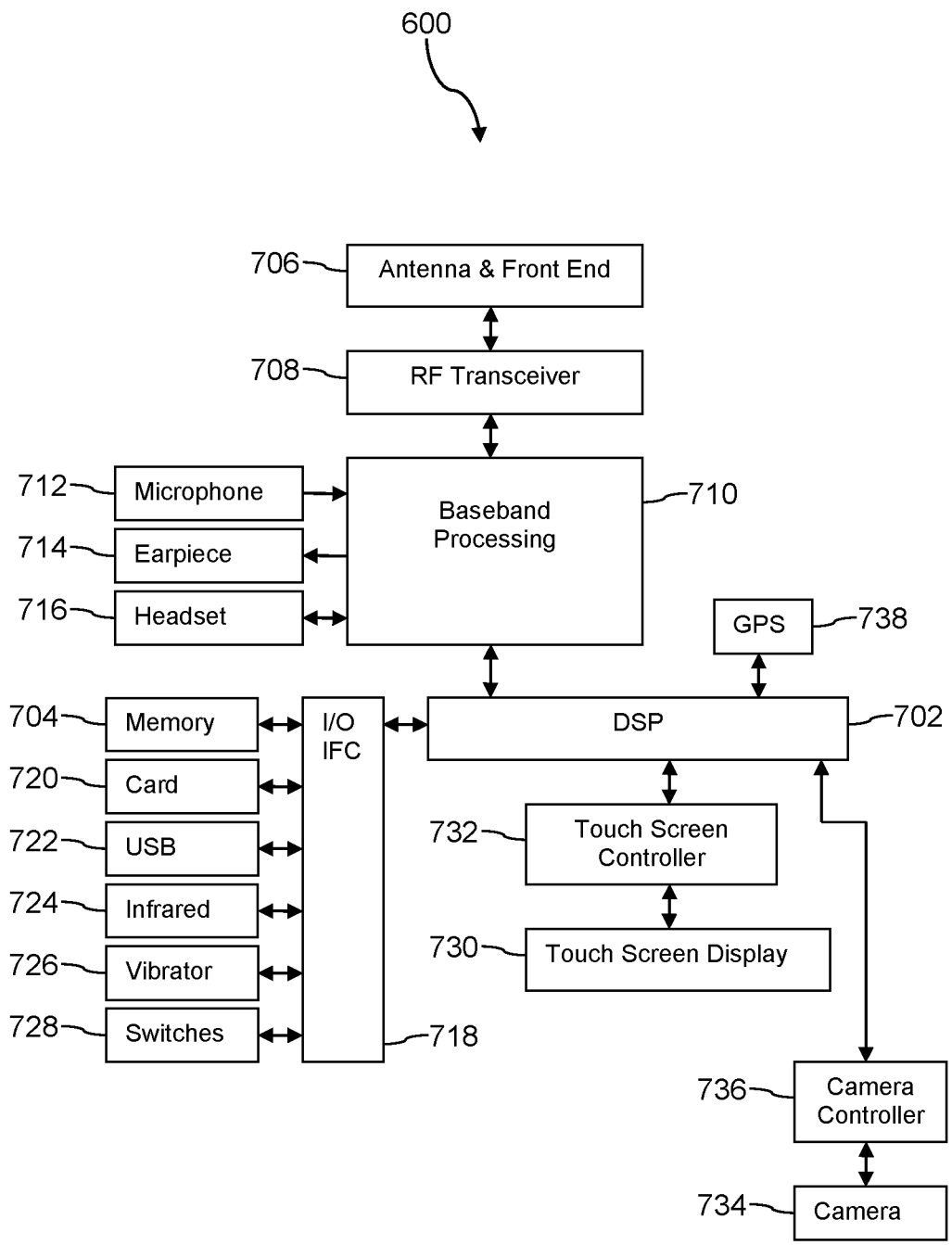
FIG. 6 is a block diagram or a hardware architecture of a wireless communication device according to an embodiment of the disclosure.

FIG. 6 shows a block diagram of the UE 600. While a variety of known components of handsets are depicted, in an embodiment a subset of the listed components and/or additional components not listed may be included in the UE 600. The UE 600 includes a digital signal processor (DSP) 702 and a memory 704. As shown, the UE 600 may further include one or more antenna and front end unit 706, a one or more radio frequency (RF) transceiver 708, a baseband processing unit 710, a microphone 712, an earpiece speaker 714, a headset port 716, an input/output interface 718, a removable memory card 720, a universal serial bus (USB) port 722, an infrared port 724, a vibrator 726, one or more electro-mechanical switches 728, a touch screen display 730, a touch screen controller 732, a camera 734, a camera controller 736, and a global positioning system (GPS) receiver 738. In an embodiment, the UE 600 may include another kind of display that does not provide a touch sensitive screen. In an embodiment, the UE 600 may include both the touch screen display 730 and additional display component that does not provide a touch sensitive screen. In an embodiment, the DSP 702 may communicate directly with the memory 704 without passing through the input/output interface 718. Additionally, in an embodiment, the UE 600 may comprise other peripheral devices that provide other functionality.

The DSP 702 or some other form of controller or central processing unit operates to control the various components of the UE 600 in accordance with embedded software or firmware stored in memory 704 or stored in memory contained within the DSP 702 itself. In addition to the embedded software or firmware, the DSP 702 may execute other applications stored in the memory 704 or made available via information carrier media such as portable data storage media like the removable memory card 720 or via wired or wireless network communications. The application software may comprise a compiled set of machine-readable instructions that configure the DSP 702 to provide the desired functionality, or the application software may be high-level software instructions to be processed by an interpreter or compiler to indirectly configure the DSP 702.

The DSP 702 may communicate with a wireless network via the analog baseband processing unit 710. In some embodiments, the communication may provide Internet connectivity, enabling a user to gain access to content on the Internet and to send and receive e-mail or text messages. The input/output interface 718 interconnects the DSP 702 and various memories and interfaces. The memory 704 and the removable memory card 720 may provide software and data to configure the operation of the DSP 702. Among the interfaces may be the USB port 722 and the infrared port 724. The USB port 722 may enable the UE 600 to function as a peripheral device to exchange information with a personal computer or other computer system. The infrared port 724 and other optional ports such as a Bluetooth® interface or an IEEE 802.11 compliant wireless interface may enable the UE 600 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 708 may comprise a near field communication (NFC) transceiver. The NFC transceiver may be used to complete payment transactions with point-of-sale terminals or other communications exchanges. In an embodiment, each of the different radio transceivers 708 may be coupled to its own separate antenna. In an embodiment, the UE 600 may comprise a radio frequency identify (RFID) reader and/or writer device.

The switches 728 may couple to the DSP 702 via the input/output interface 718 to provide one mechanism for the user to provide input to the UE 600. Alternatively, one or more of the switches 728 may be coupled to a motherboard of the UE 600 and/or to components of the UE 600 via a different path (e.g., not via the input/output interface 718), for example coupled to a power control circuit (power button) of the UE 600. The touch screen display 730 is another input mechanism, which further displays text and/or graphics to the user. The touch screen LCD controller 732 couples the DSP 702 to the touch screen display 730. The GPS receiver 738 is coupled to the DSP 702 to decode global positioning system signals, thereby enabling the UE 600 to determine its position.

Figure 7A:
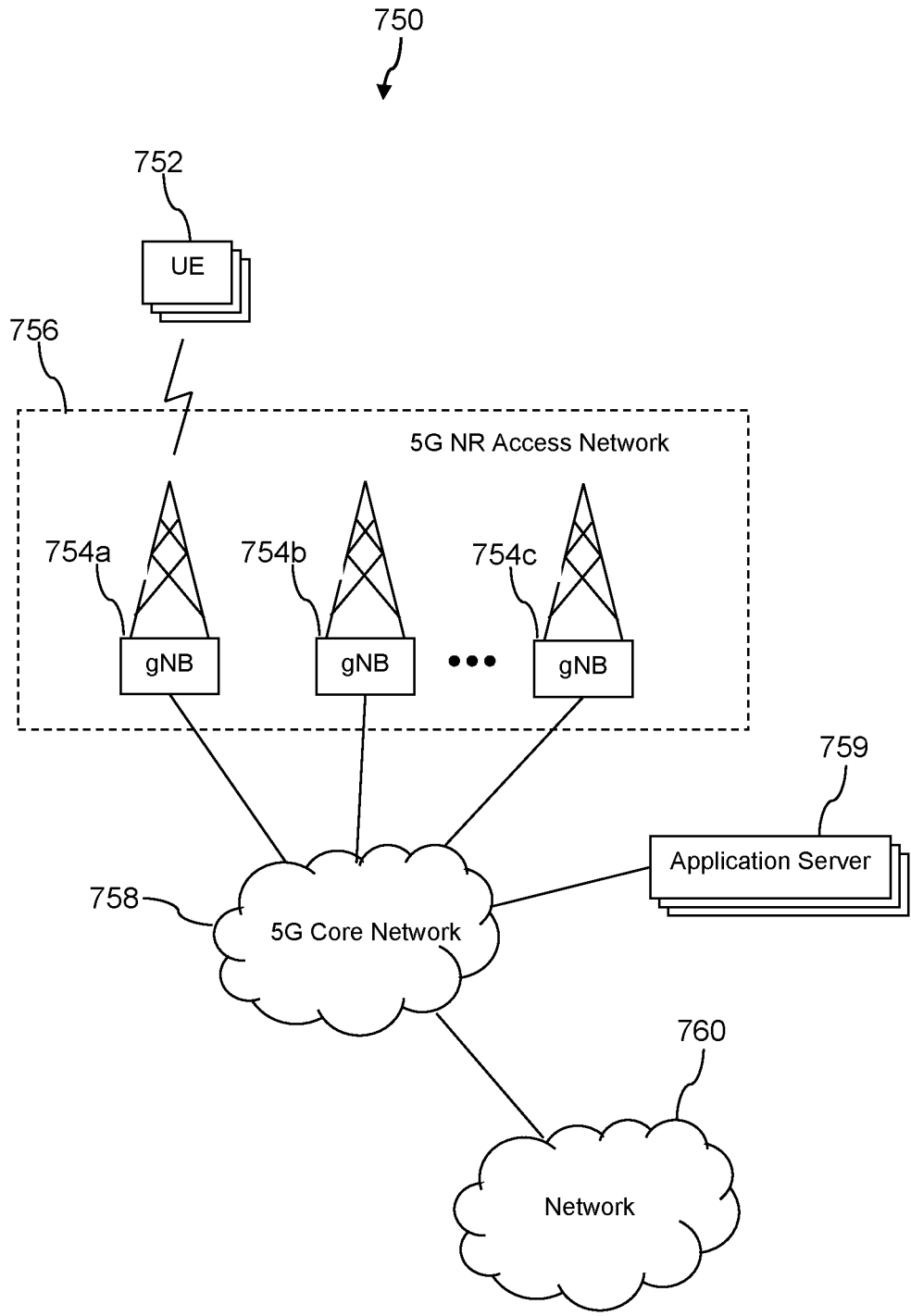
FIG. 7A is a block diagram of another communication system according to an embodiment of the disclosure.

Turning now to FIG. 7A, an exemplary communication system 750 is described. Typically, the communication system 750 includes a number of access nodes 754 that are configured to provide coverage in which UEs 752 such as cell phones, tablet computers, machine-type-communication devices, tracking devices, embedded wireless modules, and/or other wirelessly equipped communication devices (whether or not user operated), can operate. The access nodes 754 may be said to establish an access network 756. The access network 756 may be referred to as a radio access network (RAN) in some contexts. In a 5G technology generation an access node 754 may be referred to as a next Generation Node B (gNB). In 4G technology (e.g., long term evolution (LTE) technology) an access node 754 may be referred to as an evolved Node B (eNB). In 3G technology (e.g., code division multiple access (CDMA) and global system for mobile communication (GSM)) an access node 754 may be referred to as a base transceiver station (BTS) combined with a base station controller (BSC). In some contexts, the access node 754 may be referred to as a cell site or a cell tower. In some implementations, a picocell may provide some of the functionality of an access node 754, albeit with a constrained coverage area. Each of these different embodiments of an access node 754 may be considered to provide roughly similar functions in the different technology generations.

In an embodiment, the access network 756 comprises a first access node 754a, a second access node 754b, and a third access node 754c. It is understood that the access network 756 may include any number of access nodes 754. Further, each access node 754 could be coupled with a core network 758 that provides connectivity with various application servers 759 and/or a network 760. In an embodiment, at least some of the application servers 759 may be located close to the network edge (e.g., geographically close to the UE 752 and the end user) to deliver so-called "edge computing." The network 760 may be one or more private networks, one or more public networks, or a combination thereof. The network 760 may comprise the public switched telephone network (PSTN). The network 760 may comprise the Internet. With this arrangement, a UE 752 within coverage of the access network 756 could engage in air-interface communication with an access node 754 and could thereby communicate via the access node 754 with various application servers and other entities.

The communication system 750 could operate in accordance with a particular radio access technology (RAT), with communications from an access node 754 to UEs 752 defining a downlink or forward link and communications from the UEs 752 to the access node 754 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"— such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 754 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 754 could define an air interface configured in a specific manner to define physical resources for carrying information wirelessly between the access node 754 and UEs 752.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 752.

In addition, certain resource elements on the example air interface could be reserved for special purposes. For instance, on the downlink, certain resource elements could be reserved to carry synchronization signals that UEs 752 could detect as an indication of the presence of coverage and to establish frame timing, other resource elements could be reserved to carry a reference signal that UEs 752 could measure in order to determine coverage strength, and still other resource elements could be reserved to carry other control signaling such as PRB-scheduling directives and acknowledgement messaging from the access node 754 to served UEs 752. And on the uplink, certain resource elements could be reserved to carry random access signaling from UEs 752 to the access node 754, and other resource elements could be reserved to carry other control signaling such as PRB-scheduling requests and acknowledgement signaling from UEs 752 to the access node 754.

The access node 754, in some instances, may be split functionally into a radio unit (RU), a distributed unit (DU), and a central unit (CU) where each of the RU, DU, and CU have distinctive roles to play in the access network 756. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 7B:
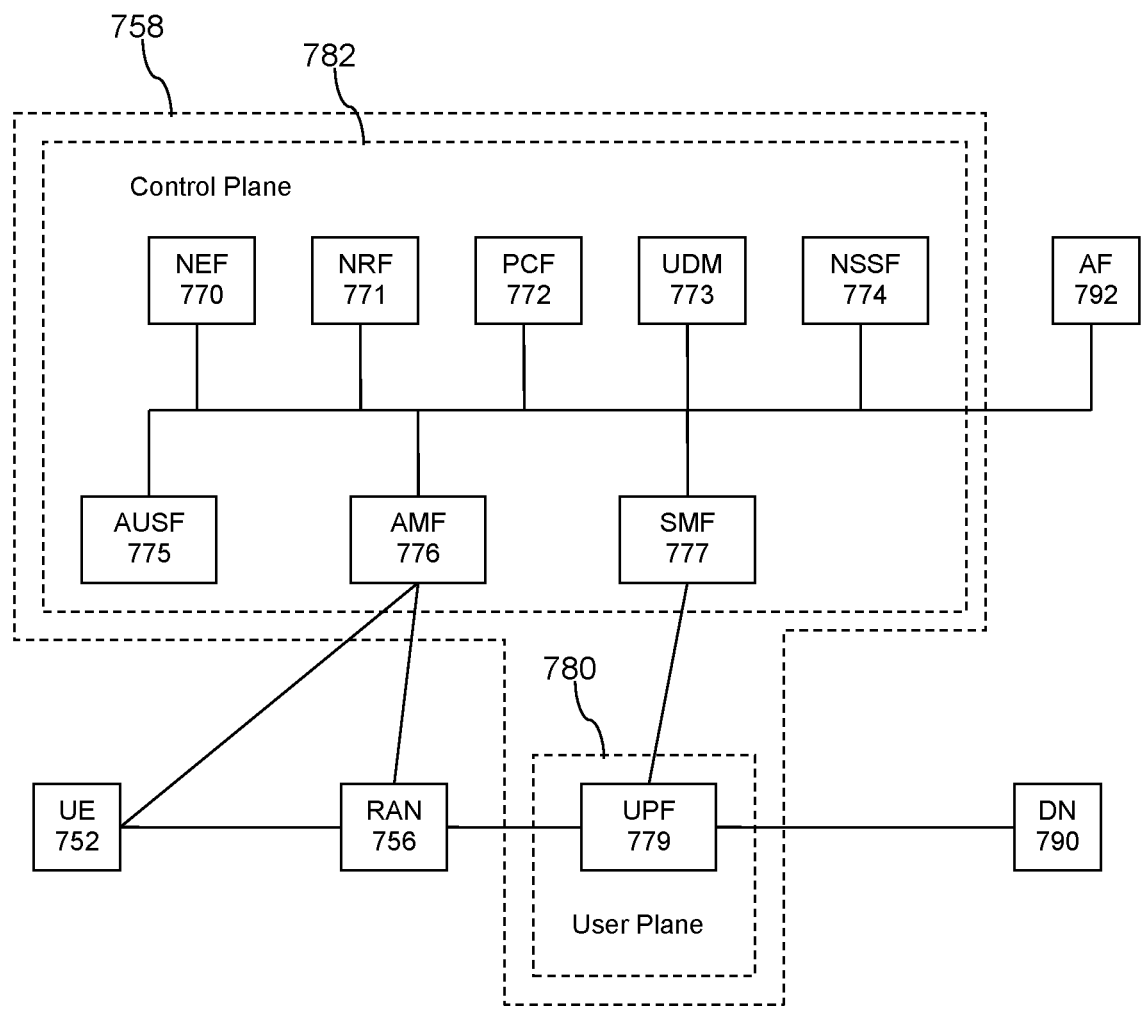
FIG. 7B is a block diagram of a core network of the communication system of FIG. 7A according to an embodiment of the disclosure.

Turning now to FIG. 7B, further details of the core network 758 are described. In an embodiment, the core network 758 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 779, an authentication server function (AUSF) 775, an access and mobility management function (AMF) 776, a session management function (SMF) 777, a network exposure function (NEF) 770, a network repository function (NRF) 771, a policy control function (PCF) 772, a unified data management (UDM) 773, a network slice selection function (NSSF) 774, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 758 may be segregated into a user plane 780 and a control plane 782, thereby promoting independent scalability, evolution, and flexible deployment.

Figure 8A:
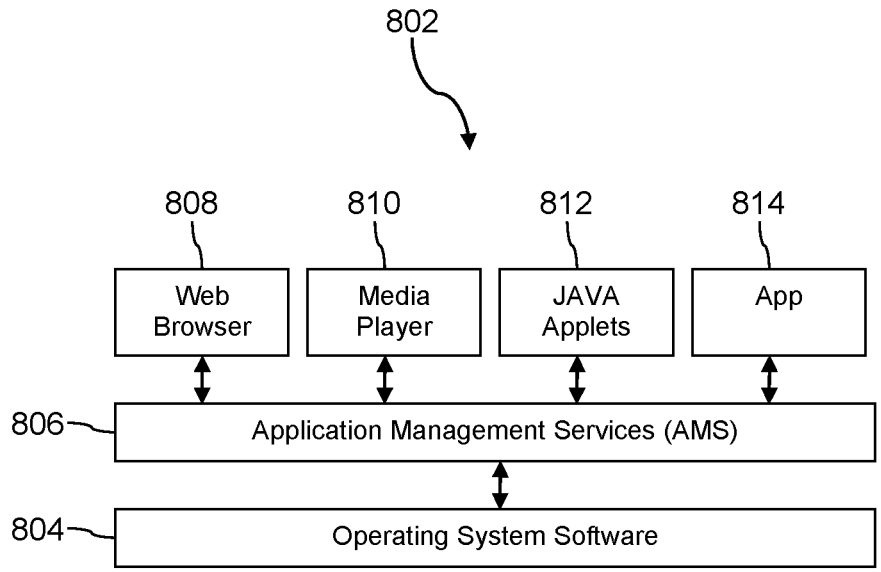
FIG. 8A is a block diagram of a software architecture of a wireless communication device according to an embodiment of the disclosure.

The UPF 779 delivers packet processing and links the UE 752, via the access network 756, to a data network 790 (e.g., the network 560 illustrated in FIG. 8A). The AMF 776 handles registration and connection management of non-access stratum (NAS) signaling with the UE 752. Said in other words, the AMF 776 manages UE registration and mobility issues. The AMF 776 manages reachability of the UEs 752 as well as various security issues. The SMF 777 handles session management issues. Specifically, the SMF 777 creates, updates, and removes (destroys) protocol data unit (PDU) sessions and manages the session context within the UPF 779. The SMF 777 decouples other control plane functions from user plane functions by performing dynamic host configuration protocol (DHCP) functions and IP address management functions. The AUSF 775 facilitates security processes.

The NEF 770 securely exposes the services and capabilities provided by network functions. The NRF 771 supports service registration by network functions and discovery of network functions by other network functions. The PCF 772 supports policy control decisions and flow based charging control. The UDM 773 manages network user data and can be paired with a user data repository (UDR) that stores user data such as customer profile information, customer authentication number, and encryption keys for the information. An application function 792, which may be located outside of the core network 758, exposes the application layer for interacting with the core network 758. In an embodiment, the application function 792 may be executed on an application server 779 located geographically proximate to the UE 752 in an "edge computing" deployment mode. The core network 758 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 774 can help the AMF 776 to select the network slice instance (NSI) for use with the UE 752.

FIG. 8A illustrates a software environment 802 that may be implemented by the DSP 702. The DSP 702 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the UE 500. Also shown in FIG. 8A are a web browser application 808, a media player application 810, and JAVA applets 812. The web browser application 808 may be executed by the UE 500 to browse content and/or the Internet, for example when the UE 500 is coupled to a network via a wireless link. The web browser application 808 may permit a user to enter information into forms and select links to retrieve and view web pages. The media player application 810 may be executed by the UE 500 to play audio or audiovisual media. The JAVA applets 812 may be executed by the UE 500 to provide a variety of functionality including games, utilities, and other functionality.

Figure 8B:
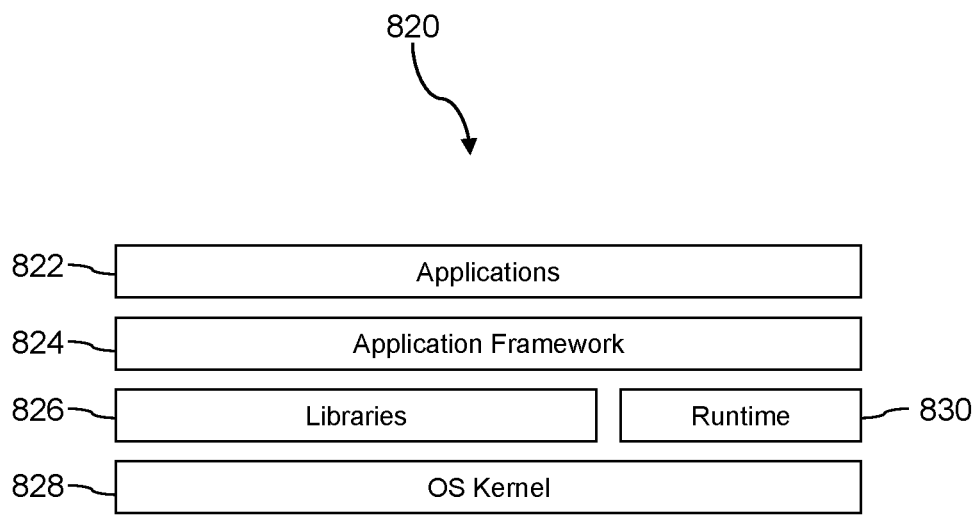
FIG. 8B is a block diagram of another software architecture of a wireless communication device according to an embodiment of the disclosure.

FIG. 8B illustrates an alternative software environment 820 that may be implemented by the DSP 702. The DSP 702 executes operating system kernel (OS kernel) 828 and an execution runtime 830. The DSP 702 executes applications 822 that may execute in the execution runtime 830 and may rely upon services provided by the application framework 824. Applications 822 and the application framework 824 may rely upon functionality provided via the libraries 826.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of selectively pre-caching content fragments, comprising:
   receiving, by an analytics engine stored on and executed by a selective pre-caching computer system, first environment data pertaining to a first wireless communication device and second environment data pertaining to a second wireless communication device;
   analyzing, by the analytics engine, the first environment data and the second environment data;
   sending, by the selective pre-caching computer system, a media presentation request for content to a content delivery network, wherein the content comprises a plurality of fragments;
   receiving, by the selective pre-caching computer system, a media presentation response from the content delivery network in response to the media presentation request;
   based on analyzing the first environment data and based on the media presentation response, determining, by a pre-cache manager stored on and executed by the selective pre-caching computer system, a first amount of fragments to provide to the first wireless communication device for pre-caching to enable playback of the content at a first quality;
   selecting, by the pre-cache manager, a first subset of fragments of the content for pre-caching on the first wireless communication device based on the determined first amount of fragments;
   based on analyzing the second environment data and based on the media presentation response, determining, by the pre-cache manager, a second amount of fragments to provide to the second wireless communication device for pre-caching to enable playback of the content at a second quality, wherein the first amount of fragments and the second amount of fragments are different;
   selecting, by the pre-cache manager, a second subset of fragments of the content for pre-caching on the second wireless communication device based on the determined second amount of fragments; and
   sending, by the selective pre-caching computer system, the first subset of fragments to the first wireless communication device and the second subset of fragments to the second wireless communication device, wherein the first wireless communication device pre-caches the first subset of fragments and the second wireless communication device pre-caches the second subset of fragments, wherein the first wireless communication device presents the content using the cached first subset of fragments and any remaining fragments received from the content delivery network, and wherein the second wireless communication device presents the content using the cached second subset of fragments and any remaining fragments received from the content delivery network.

2. The method of claim 1, wherein the first environment data comprises one or more of radio frequency environment data associated with a first area in which the first wireless communication device is located, overall radio network capacity in the first area, or packet core latency and routing metrics.

3. The method of claim 1, wherein the second environment data comprises one or more of radio frequency environment data associated with a second area in which the second wireless communication device is located, overall radio network capacity in the second area, or packet core latency and routing metrics.

4. The method of claim 1, wherein the analysis of the first environment data includes applying a machine learning model to the first environment data, and wherein the analysis of the second environment data includes applying the machine learning model to the second environment data.

5. The method of claim 4, further comprising receiving, by the analytics engine, playback data from the content delivery network corresponding to first wireless communication device presenting the content and the second wireless communication device presenting the content, wherein the machine learning model is trained based on the playback data from the content delivery network.

6. A system for selectively pre-caching content fragments, comprising:
   a processor;
   a non-transitory memory;
   an analytics engine stored in the non-transitory memory, that when executed by the processor:
      receives first environment data pertaining to a wireless communication device at a point in time,
      analyzes the first environment data,
      receives second environment data pertaining to the wireless communication device at a subsequent point in time, and
      analyzes the second environment data; and
   a pre-cache manager stored in the non-transitory memory, that when executed by the processor:
      based on analyzing the first environment data, determines a first amount of fragments to provide to the wireless communication device for pre-caching to enable playback of a first set of content at a first quality,
      selects a subset of fragments of each content in the first set of content for pre-caching on the wireless communication device based on the determined first amount of fragments, wherein the subset of fragments of each content in the first set of content is sent to the wireless communication device, and wherein the wireless communication device pre-caches the subset of fragments of each content in the first set of content,
      based on analyzing the second environment data, determines a second amount of fragments to provide to the wireless communication device for pre-caching to enable playback of a second set of content at a second quality, wherein the second amount of fragments and the first amount of fragments are different, and
      selects a subset of fragments of each content in the second set of content for pre-caching on the wireless communication device based on the determined second amount of fragments, wherein the subset of fragments of each content in the second set of content is sent to the wireless communication device to replace at least some pre-cached fragments on the wireless communication device, and wherein the wireless communication device removes the at least some pre-cached fragments and pre-caches the subset of fragments of each content in the second set of content.

7. The system of claim 6, wherein the first environment data comprises one or more of radio frequency environment data associated with a first area in which the wireless communication device is located at the point in time, overall radio network capacity in the first area at the point in time, or packet core latency and routing metrics at the point in time, and wherein the second environment data comprises one or more of radio frequency environment data associated with a second area in which the wireless communication device is located at the subsequent point in time, overall radio network capacity in the second area at the subsequent point in time, or packet core latency and routing metrics at the subsequent point in time.

8. The system of claim 6, wherein the first quality and the second quality are the same.

9. The system of claim 6, wherein the analysis of the first environment data includes applying a machine learning model to the first environment data, and wherein the subset of fragments of each content in the first set of content are selected based on applying the machine learning model to the first environment data.

10. The system of claim 9, wherein the wireless communication device presents at least some of the first set of content using the cached subset of fragments and remaining fragments received from a content delivery network, and wherein the analytics engine is further configured to receive playback data from the content delivery network corresponding to the wireless communication device presenting the at least some of the first set of content.

11. The system of claim 10, wherein the machine learning model is trained based on the playback data from the content delivery network.

12. The system of claim 11, wherein the analysis of the second environment data includes applying the trained machine learning model to the second environment data, and wherein the subset of fragments of each content in the second set of content are selected based on applying the trained machine learning model to the second environment data.

13. A method of selectively pre-caching content fragments, comprising:
  receiving, by an analytics engine stored on and executed by a selective pre-caching computer system, environment data pertaining to a wireless communication device;
  analyzing, by the analytics engine, the environment data;
  sending, by the selective pre-caching computer system, a media presentation request for content to a content delivery network, wherein the content comprises a plurality of fragments;
  receiving, by the selective pre-caching computer system, a media presentation response from the content delivery network in response to the media presentation request;
  based on analyzing the environment data and based on the media presentation response, determining, by a pre-cache manager stored on and executed by the selective pre-caching computer system, an amount of fragments to provide to the wireless communication device for pre-caching to enable playback of the content at a certain quality;
  selecting, by the pre-cache manager, a subset of fragments of the content for pre-caching on the wireless communication device based on the determined amount of fragments;
  sending, by the selective pre-caching computer system, the subset of fragments to the wireless communication device, wherein the wireless communication device pre-caches the subset of fragments, and wherein the wireless communication device presents the content using the cached subset of fragments and remaining fragments of the plurality of fragments received from the content delivery network; and
  receiving, by the analytics engine, playback data from the content delivery network corresponding to the wireless communication device presenting the content.

14. The method of claim 13, wherein the environment data comprises radio frequency environment data associated with an area in which the wireless communication device is located, overall radio network capacity in the area, and packet core latency and routing metrics.

15. The method of claim 13, wherein the determining the amount of fragments to provide to the wireless communication device for pre-caching is also based on characteristics of the wireless communication device.

16. The method of claim 13, wherein the analyzing includes applying a machine learning model to the environment data, and wherein the subset of fragments are selected based on applying the machine learning model to the environment data.

17. The method of claim 16, further comprising training the machine learning model based on the playback data from the content delivery network.

18. The method of claim 13, wherein the subset of fragments of the content are not contiguous.

19. The method of claim 13, wherein the media presentation response comprises a plurality of different video opportunities for the content at different video quality.

20. The method of claim 19, wherein the plurality of different video opportunities for the content at different video quality comprises different resolutions for the content.

* * * * *